United States Patent

[11] 3,591,760

[72] Inventor: Kiyoshi Inoue
100 Sakato, Kawasaki, Kanagawa, Japan
[21] Appl. No.: 723,799
[22] Filed: Apr. 24, 1968
[45] Patented: July 6, 1971
[32] Priority: June 28, 1967, Sept. 2, 1967
[33] Japan
[31] 42/41494 and 42/56310
Continuation-in-part of application Ser. No. 508,487, Nov. 18, 1965, now Patent No. 3,512,384, and a continuation-in-part of 574,056, Aug. 22, 1966.

[54] ELECTROEROSION OF CONDUCTIVE WORKPIECES BY SEQUENTIALLY USED SIMULTANEOUSLY NEST-MOLDED ELECTRODES
5 Claims, 11 Drawing Figs.

[52] U.S. Cl. ................................... 219/69, 204/143
[51] Int. Cl. .................................. B23p 1/04, B23p 1/08
[50] Field of Search ......................... 219/69 E, 69; 204/143

[56] References Cited
UNITED STATES PATENTS
2,813,966  11/1957  Matulaitis .................. 219/69 E
2,908,797  10/1959  Stegler ...................... 219/69 E Primary Examiner—R. R. Staubly
Attorney—Karl F. Ross ABSTRACT: Method of making an electrode for the electrochemical machining or the electric discharge machining of a metallic workpiece, especially for the production of a number of substantially identical electrodes adapted to be used for the serial machining of numerous workpieces, wherein an electrode blank in the form of a metal sheet is placed over a die having a contour corresponding to that of the finished-body shape and is conformed to the die by high-energy-rate forming with a shock wave generated by spark discharge (see U.S. Pat. Nos. 3,208,254 and 3,232,088). When the electrode is used for the electric discharge machining of a workpiece, a thin spacing layer is applied along its surface juxtaposed with the die prior to spark forming and is thereafter removed so that the overlying metal body constitutes a rough-forming electrode designed to shape the contours initially. The finish-forming electrode may be formed simultaneously, e.g. as the spacer layer.

PATENTED JUL 6 1971

KIYOSHI INOUE
INVENTOR.

BY Karl F. R....

ATTORNEY

KIYOSHI INOUE
INVENTOR.

BY Karl F. Ross
ATTORNEY

FIG.8-A
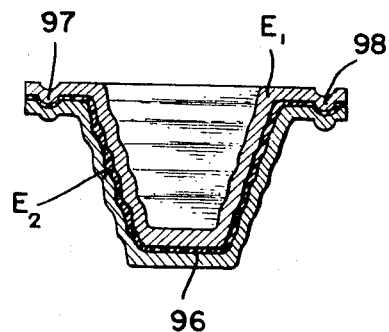
FIG.8-B
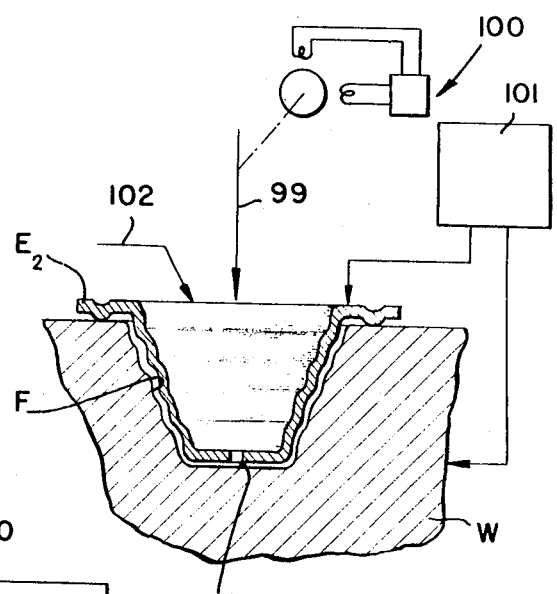
FIG.8-D
FIG.8-C
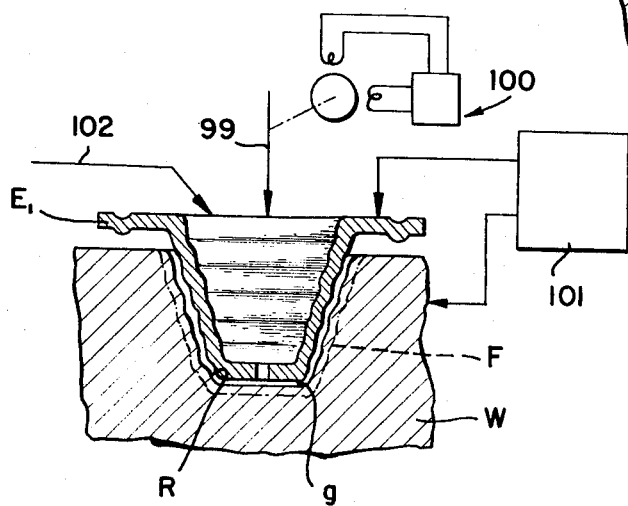
KIYOSHI INOUE
*INVENTOR.*
BY  Karl F. Ross
ATTORNEY

ELECTROEROSION OF CONDUCTIVE WORKPIECES BY SEQUENTIALLY USED SIMULTANEOUSLY NEST-MOLDED ELECTRODES

This application is a continuation-in-part of my applications Ser. No. 508,487 (now U.S. Pat. No. 3,512,384) and Ser. No. 574,056, filed Nov. 18, 1965 and Aug. 22, 1966, respectively.

My present invention relates to a method of making an electrode for the electrical machining of a metallic workpiece, to an electrode produced by this method, and to a method of carrying out the shaping of a metallic body using such electrode.

I and others have proposed numerous techniques in the electrical machining of metallic workpieces in which a preshaped electrode body is used to sink a cavity of predetermined shape in the metallic workpiece or to otherwise impart predetermined contours to the latter. For example, in my U.S. Pat. Nos. 3,252,881, 3,357,912, 3,371,022 and 3,378,473, I have described systems for the electrochemical machining (ECM) of a metallic workpiece in which an electrode and a workpiece are displaced relatively in spaced relation while an electrolyte is supplied to the gap therebetween and an electrolysis current is passed through the tool electrode and the workpiece electrode to electrolytically erode portions of the workpiece juxtaposed with the electrode. The eroded portion, partly in solution and partly in the form of particles, are carried away by the moving electrolyte. This technique is suitable for the sinking of cavities in a workpiece, for imparting desired contours thereto when a contoured tool electrode is employed and for the formation of holes in taps and the like anchored in a workpiece to enable braking up of the taps and subsequent removal. Further developments along these lines are described in my copending applications Ser. No. 511,827 and Ser. No. 598,391, filed Dec. 6, 1965 and Dec. 1, 1966, respectively.

Another electrical machining technique involves the use of impulsive spark discharge which electromechanically chips particles of a workpiece from areas thereof juxtaposed with the tool electrode. In systems of this type, known generally as electric discharge machining (EDM), a servomechanism is employed to maintain a predetermined gap spacing between the tool electrode and the workpiece, which constitutes the other electrode, while a dielectric liquid of low conductivity floods the gap to act as a coolant and carry away the eroded particles. The power supply may include a capacitor bank and switching devices designed to apply high-energy current pulses across the gap to effect spark discharge. Such systems are described in my U.S. Pats. No. 3,333,081 and 3,360,683 as well as copending application Ser. No. 401,308, filed Oct. 5, 1964, (now Pat. No. 3,409,753). It is also possible (see my application Ser. No. 535,268, filed Jan. 19, 1966, now Pat. No. 3,417,006 to carry out a combined or sequential ECM and EDM operation by a system which can be designated electrochemical discharge machining (ECDM) wherein principles of both of the aforementioned techniques are used.

In both electrochemical machining and electric discharge machining, a significant problem arises vis-a-vis the electrode. Thus, electric machining results in an erosion of the electrode together with the workpiece, although with proper selection of the machining parameters and an appropriate choice of the electrode material, the electrode wear can be minimized. When, however, intricate contours are to be formed in or on the workpiece, even slight electrode wear poses a problem which will be readily recognized. Initially a precision contour, generally complementary to that desired in the workpiece, is formed in the tool electrode and electrochemical machining commences. During the roughing stages of shaping, especially when relatively deep cavities are to be sunk, the tool electrode loses precision and, as the final machining stage approaches, is incapable of imparting the desired final configuration to the workpiece with the requisite accuracy. Accordingly, a finish-forming electrode may be required or replacement of the electrode may be necessary at intermediate stages. Additionally, prior art methods have made it necessary to prepare the electrodes by careful hand-machining or by shaping using highly skilled die makers with increasing cost. As a result, the overall costs of electrical machining processes have been higher than desirable, especially when deep cavities with intricate contours are to be made.

It is, therefore, the principal object of the present invention to provide an improved method of making an electrode for the chemical machining of metallic workpieces in which the production costs are reduced, numerous similar electrodes can be made of substantially identical configuration with a minimum of labor cost, and the use of the electrodes can reduce the overall cost of electrical machining processes.

Still another object of this invention is to provide an improved electrode structure for the electromechemical and/or electric-discharge machining of a metallic workpiece.

Yet another object of this invention is to provide an improved method of electrical machining a conductive workpiece in which low machining cost is combined with surprisingly high precision and short machining time.

I have now found that it is possible, in spite of earlier beliefs that best machining results and minimum effect of electrode wear were obtainable with massive solid electrodes, to make use of a sheet metal electrode which has been conformed to a master contour by high-energy rate or shock forming in the electrochemical machining or electric-discharge machining of a metallic workpiece without any disadvantage whatsoever and, in fact, with the surprising advantage that numerous identical electrodes can be made rapidly and without difficulty for replacement of electrodes subject to wear or for use at various stages in the machining process. Thus, a principal feature of the present invention resides in the use, in electrochemical machining or electric-discharge machining, especially cavity sinking, of a metallic workpiece, of a sheet metal electrode of substantially uniform cross section and thickness which has been given the desired configuration by high-energy rate forming in accordance with the principles established in my U.S. Pats. No. 3,208,255 and 3,232,085, and as further developed in my copending applications Ser. No. 508,487 and Ser. No. 574,056.

The electrode structure of the present invention comprises clamping means designed to retain the sheet metal electrode which is preferably provided with a planar outwardly extending peripheral flank adapted to be received between a pair of clamping portions including, for example, a lower clamping ring through the center of which passes the machining portion of the electrode. The later may be provided with one or more openings through which the coolant (i.e. electrolyte in the case of electric-discharge machining) is passed.

The shock forming of the electrode is preferably carried out with a nonconductive liquid force-transmitting medium in which an arc-type or spark-type discharge is effected. The discharge can be initiated by fusion of a wire or other fusible element bridging the gap between a pair of electrodes. The die cavity beneath the electrode blank is, advantageously, evacuated to prevent the development of fluid cushions which might impede conformance of the blank to the contours of the die. When large-area electrodes are employed, a series of shock waves is rolled over the surface of the blank. The shock-forming process also provides a formation in the annular peripheral flange of the electrode for mating engagement with the flange of the clamping ring to assure precise reproducible positioning of the successive electrode mounted in the electrode holder.

According to a further feature of this invention, a spacer layer is applied along the underside of the blank prior to the shock forming thereof in the underlying die. This spacer layer, which may be stripped from the finished tool electrode, is designed to impart an outline to the electrode just under that necessary for the finish-forming electrode, the underside electrode being then employed for rough forming. Prior to the development of this technique, it was necessary to provide a separate master for the rough-forming electrode and the finish-forming electrode. After the production of the rough-forming electrode with a spacer layer as indicated, the cavity can be used to form the finishing electrode without the spacer layer. Alternatively, the spacer layer can constitute the finish-forming electrode upon its removal from the rough-forming portion.

The above and other objects, features and advantages of the present invention will becomes more readily apparent from the following description, reference being made to the accompanying drawing in which:

FIGS. 8A—8D represent sequential steps in a process for electric discharge machining of a workpiece in accordance with the principles of the present invention.

Figure 1:
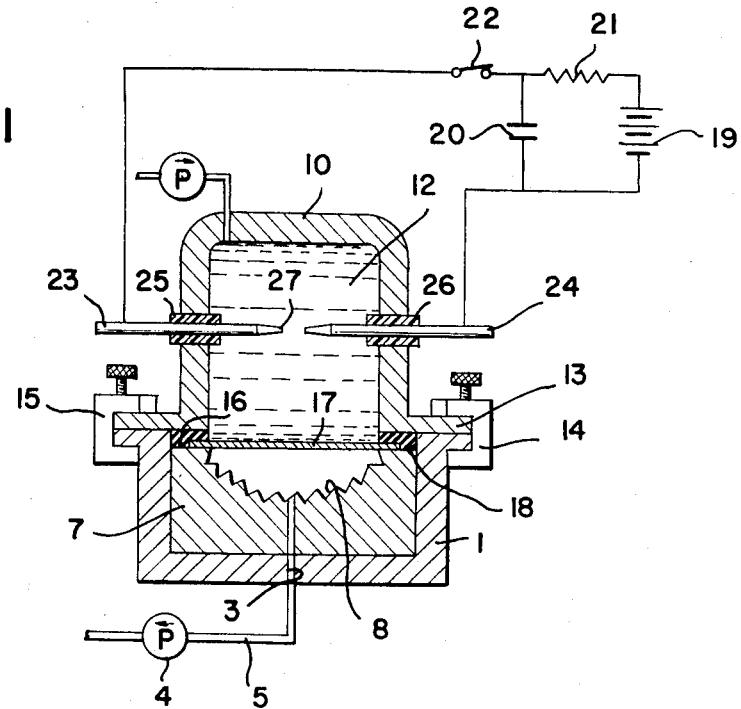
FIG. 1 is a vertical cross-sectional view through an apparatus for making an electrode in accordance with the present invention.

In FIG. 1, I show a system for the production of an electrode for the electric machining of a metallic workpiece generally patterned after the shock-forming systems of my copending applications Ser. No. 508,487, filed Nov. 18, 1965 and Ser. No. 574,056, filed Aug. 22, 1966, and the prior applications and patents mentioned therein. This system comprises an upwardly open lower housing portion 1 having an outer peripheral flange 2 and formed with an opening 3 communicating with a suction pump 4 via a line 5. The chamber 6 of this lower housing portion receives a die 7 whose cavity 8 is intricately contoured and forms a master for the tool electrode to be produced. The cavity 8 can be evacuated by the pump 4 which communicates therewith via a bore 9 formed in the replaceable die 7 and registering with the aperture 3.

The upper housing portion 10 is a downwardly open cylinder whose chamber 11 receives a nonconductive liquid dielectric 12 (e.g. kerosene or transformer oil) which acts as a force-transmitting medium in the shock wave generator. An outwardly extending peripheral flange 13 of the upper housing portion 10 overlies the flange 2 so that clamps 14 and 15 may sealingly secure the upper and lower housing portions together. The die 7 has a ledge 16 upon which the relatively thin electrode blank 17 is disposed, the blank being composed of copper, brass or other copper alloy and having a thickness preferably in the range of 0.5 to 10 mm. although best results are obtainable with electrodes of 1—4 mm. in thickness. The blank 17 is peripherally overlain by a sealing washer 18 clamped between the upper and lower housing members 1 and 10.

The energy source for the forming operation comprises any of those described in the last-mentioned spark- or shock-forming applications and patents and may include a DC source such as the battery 19 which can charge the capacitor bank represented at 20 through the charging resistor 21. When switch 22 is closed, the capacitor 20 discharges across a pair of electrodes 23 and 24 slidable radially in insulating sleeves 25 and 26 at diametrically opposite locations of the upper housing portion 10. The electrodes 23 and 24 can be advanced toward one another in step with the electrode consumption to maintain a constant electrode gap 27 therebetween. It will be noted that the switch 22 can be omitted when breakdown across the gap 27 is initiated by advance of at least one of the electrodes 23, 24 toward the other until the potential across the electrodes exceeds the breakdown voltage of the remaining gap distance. One or more discharges can be generated across the gap 27 to shape the blank 17 to conform to the contours of the cavity 8 as represented for the shaped sheet metal body 28 in FIG. 2. The electrode can be completed by a plate 29 which spans the open side of the electrode and is welded or soldered thereto along the annular seam 30. To ensure proper positioning of the plate electrode holder 29 on the electrode 28, the latter is left in the die 7 after removal of the upper housing member 10 and a jig 31 (FIG. 3) is mounted on the flange 2.

Figure 2:
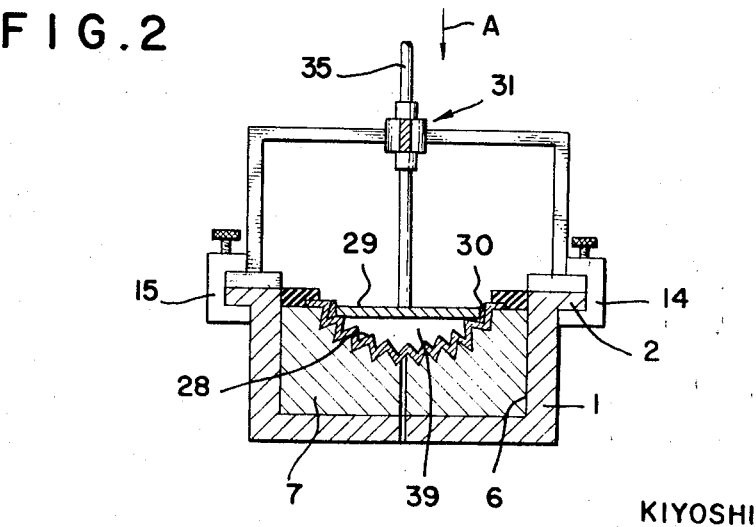
FIG. 2 is a cross-sectional view showing an assembly for mounting the electrode holder thereon.
Figure 3:
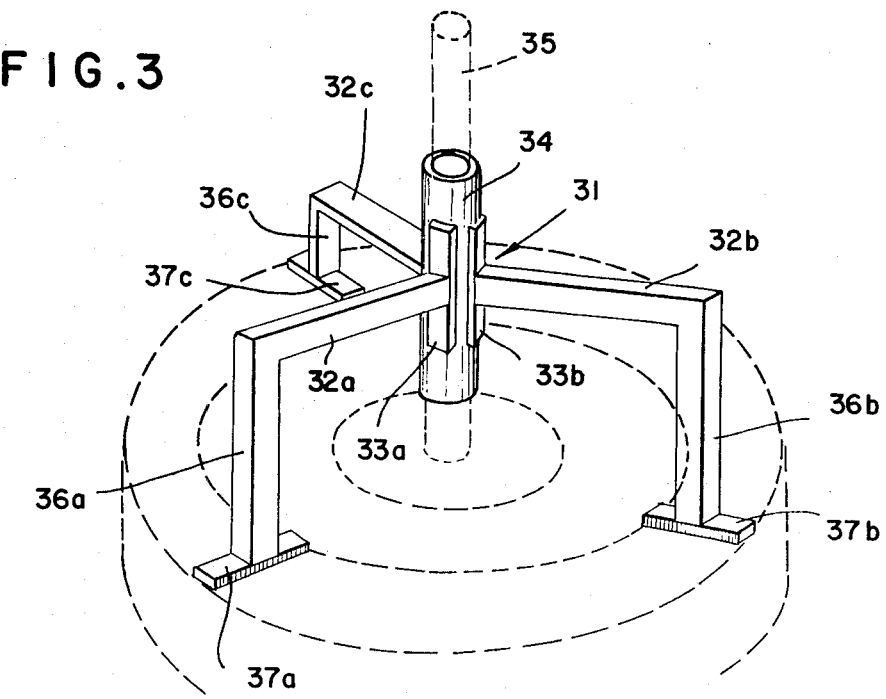
FIG. 3 is a perspective view of the jig of this assembly.

This jig comprises a spider arrangement of three angularly equispaced radially extending legs 32a, 32b and 32c which are welded via blocks 33a, 33b etc. to a sleeve 34 accommodating the rod 35 of the electrode assembly. The legs 32a—32c have downwardly extending shanks 36a—36c which terminate in radially extending feet 37a—37c. The feet rest upon the flange 2 and may be retained in place by the clamps 14 and 15. The plate 29 is welded to the rod 35, constituting the electrode holder. The rod 35 is inserted from below into the sleeve 34 of the jig 31 and the latter then positioned as shown in FIG. 2. The rod 35 can then be lowered (arrow A) to bring the plate 29 into contact with the electrode 28 which is welded thereto at the seam 30 as previously indicated. The rod 35 may be provided with an axial bore serving to deliver electrolyte or dielectric coolant to the chamber 39 formed between the plate 29 and the electrode 28. The latter may be perforated to deliver the coolant to the machining gap. As noted earlier, the electrode of FIG. 2 can be used for electrochemical or electric-discharge machining.

Figure 4:
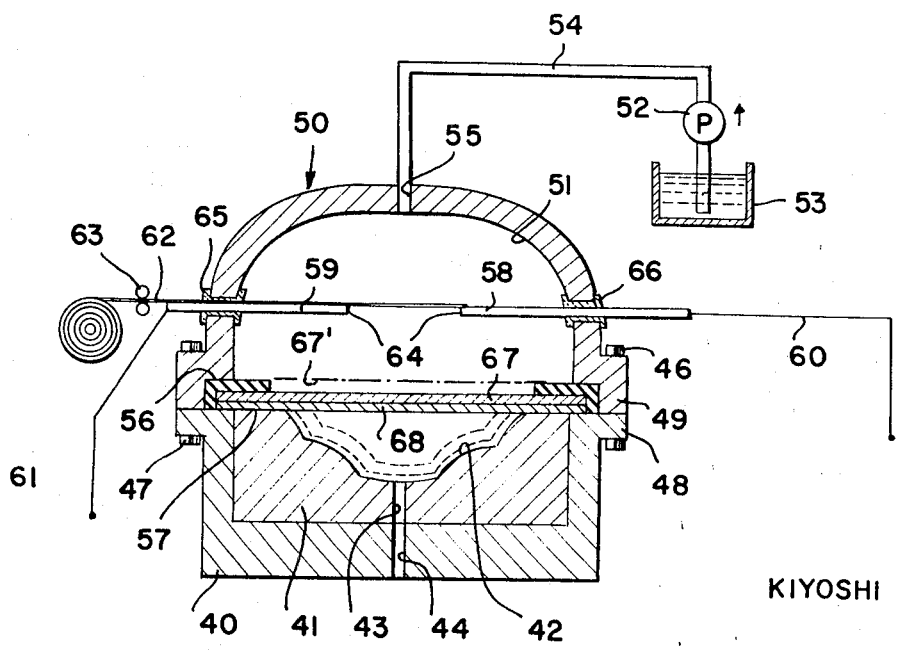
FIG. 4 is a view similar to FIG. 1 of another apparatus in accordance with this invention.

In FIG. 4, I show an alternative embodiment wherein the lower housing member 40 receives the die 41 whose cavity 42 communicates via bore 43 and a registering aperture 44 of the housing with a suction pump as described in connection with FIG. 1. Here, however, the clamps are replaced by bolts 46 and 47 designed to lock the flange 48 of the lower housing member 40 to the flange 49 of a dome-shaped upper housing member 50. The dielectric fluid may, as in the system of FIG. 1, be supplied to the chamber 51 of the upper housing part by a pump 52 from a reservoir 53. A line 54 connects the pump 52 with an inlet fitting 55 at the upper end of housing member 50. The latter clamps a gasket 56 against the edge 57 of the die 41 and against the flange 48 to prevent loss of pressure from the chamber 51 or escape of fluid.

In this embodiment, the discharge means includes a pair of principal electrodes 58 and 59 which are connected by leads 60 and 61 to a discharge source such as that shown at 19, 20 and 21 of FIG. 1. Here, however, the discharge can be initiated by the temporary bridging of the electrodes 58 and 59 by a fusible wire 62 fed by the rollers 63 across the gap 64 between the electrodes. The electrodes 58 and 59 are received in insulating bushings 65 and 66. A discharge is initiated here when the fusible wire 62, whose thickness is a small fraction of the thickness of the electrode rods 58 and 59, is in slidable electrically contacting relation with the electrode 59 and is advanced across the gap until it approaches electrode 58. The current surge from the capacitor causes fusion and resistive-heating destruction of the wire 62 spanning the space 64, thereby resulting in automatic formation of an increasing gap sustaining a widening discharge until the capacitor is drained. This system augments the power available for shaping the workpiece.

The workpiece here includes a metal blank 67, e.g. copper of a thickness of 1—4 mm., along the underside of which is provided a spacing layer 68. The latter may be a thin foil of paper secured by a contact or pressure-sensitive adhesive to the metal sheet, a plastic laminate deposited in situ or bonded as a foil to the sheet metal blank, a spray, roller or dip-coated layer or, as described in connection with FIGS. 8A and 8D, another metal foil which may be removed from the blank 68 in a convenient manner. If the solid-line contour of the cavity 42 corresponds to the dimensions and contour of the cavity to be formed in the workpiece, overcutting can be avoided by rough forming the electrode so that its outer contours are somewhat undersized. The shim or spacer layer 68, which may have a thickness ranging from 1 mm. to 4 mm. but can be as thin as 0.1 to 1 mm., separates the blanks 66 from the contour 42 as represented by the dotted lines in FIG. 4.

Figure 5:
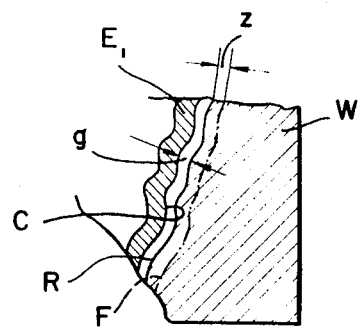
FIG. 5 is an enlarged cross-sectional view showing the relationship between electrode and workpiece in accordance with the principles of this invention.

In FIG. 5, I have diagrammatically illustrated the principle involved in the use of the shim. Here the workpiece W is machined by the rough-finishing electrode $E_1$ at a spacing $g$ constituting the machining gap and approximately equal to the thickness of the spacer layer 68. As a consequence, the rough-forming contour R is formed without danger of overcutting. Should a spacer 68 not have been provided in the cavity 42 (FIG. 4), the contours C of the electrode $E_1$ would have been substantially of the dimensions of the finished contour F (FIG. 5) with the possibility of overcutting. In the system of the present invention, when the machining is carried out until a thin zone Z remains between the desired contour and the roughed-out surface R, the electrode $E_1$ is replaced by an electrode $E_2$ (see FIGS. 8A—8D) and the small amounts of material remaining are removed therewith.

Figure 6:
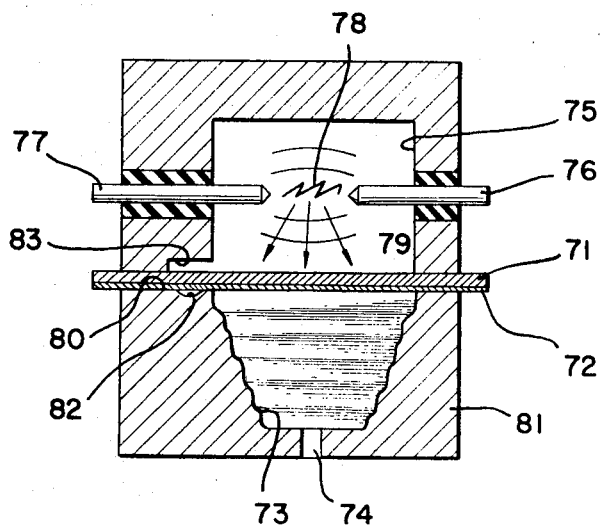
FIG. 6 is a cross-sectional view through another apparatus for making an electrode.
Figure 7:
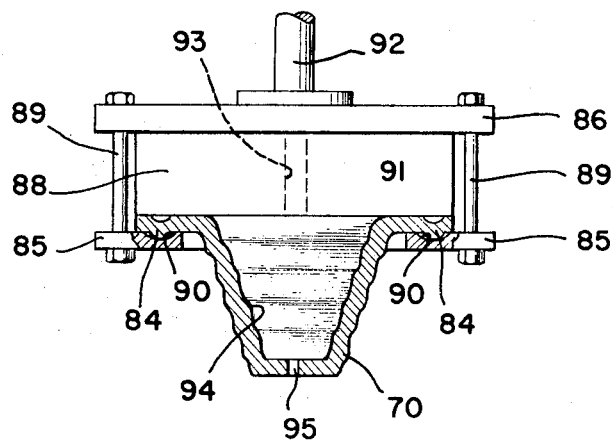
FIG. 7 is a representation of the electrode assembly made with the system of FIG. 1.

In FIG. 6, I show an apparatus for making an electrode 70 in which the blank 71 is provided with an underlying layer 72 and is disposed above a cavity 73 which can be evacuated via a port 74. In this embodiment, a gas chamber 75 is formed above the blank 71 and has a pair of electrodes 76 and 77 energized by the circuit shown in FIG. 1 to promote a spark discharge 78 across the gap therebetween. The resulting shock wave is propagated in the direction of arrow 79 to shape the blank 71 and constitute a rough-forming electrode $E_1$ therefrom. Along the ledge 80 of the lower housing member 81, however, I provide a depression 82 while above the blank 71, the chamber 75 is formed with an antechamber 83 overlying the recess 82. The shock wave in the region thus forms a protuberance 84 on the annular peripheral flange 85 of the electrode (FIG. 7).

The electrode holder here comprises a clamping device having a plate 86 and a ring 87 which draws the electrode 70 against a boss 88 when the bolts 89 are tightened. For accurate positioning of the electrode 70, e.g. to ensure identical orientation of the finish-machining and rough-machining electrodes or for mass production of numerous bodies the ring 87 is provided with recesses 90 complementarily receiving the protuberances 84. Through the central aperture 91 of the ring, the machining portion of the electrode 70 protrudes The boss 88 and its shaft 92 are provided with a bore 93 communicating with the interior 94 of the electrode to deliver the dielectric coolant to gap via its aperture 95.

A preferred operational sequence is shown in FIGS. 8A—8D and prior to discussing the sequence it should be pointed out that the shock-forming electrode-shaping device may be mounted upon an electric-discharge machining apparatus to provide the shock waves necessary to shape the electrode.

In FIG. 8A, I show an arrangement in which the shim layer consists of a copper sheet separated from the roughing electrode by a parting layer 96 of an antifriction material such as polytetrafluorethylene (Teflon). The parting layer may be applied as a spray to the underside of the blank forming the roughing electrode $E_1$ as a sandwich with the finishing electrode $E_2$. Both electrodes have the protuberances 97 and 98 receivable in the ring 87 as previously mentioned. After shock forming (FIG. 8A), the electrodes are separated (FIG. 8B) and the parting layer removed by solvent or mechanical polishing. In FIG. 8C, the rough-forming electrode $E_1$ is shown in use for the rough forming of a cavity R in the workpiece W which is intended to be shaped to the finished configuration F represented by dot-dash line in FIG. 8C and a solid line in FIG. 8D. In these FIGS. the rough-forming electrode $E_1$ and the finish-forming electrode $E_2$ are shown to be displaced downwardly (arrow 99) by a servomotor arrangement 100 to maintain constant the width of the gap $g$ and $g'$ between rough-forming electrode $E_1$ or finish-forming electrode $E_2$ and the workpiece W. A spark-discharge power supply is here connected between the electrode $E_1$ or $E_2$ and the workpiece W as represented at 101 while the dielectric liquid is supplied at 102. The means for circulating the dielectric liquid through the gap and for effecting the servo-controlled displacement of the electrodes $E_1$ and $E_2$, and the power supply means can be those described and illustrated in U.S. Pats. No. 3,333,081 and No. 3,360,583 or application Ser. No. 401,308 filed Oct. 5, 1964 (now Pat. No. 3,409,753) and the patents and applications mentioned therein. When the electrode $E_1$ has reached the point illustrated in FIG. 8C, it is dismounted from the support (FIG. 7) and replaced by the electrode $E_2$ which previously had constituted the spacer or shim layer. Finish-forming continues as shown in FIG. 8D.

It has been found that the electrodes made by shock forming in the manner previously described afford greater accuracy than has been possible with prior art electrode systems of the character described, for example, in the last-mentioned patents and applications and is capable of an accuracy in reproducing the master contour in the finished product of about ± 0.05 mm. or better. The plate welded to the electrodes in FIG. 2 will customarily be used whenever the electrode is relatively thin and indeed it is possible to fill or partly fill the chambers 39 and 94 of the electrodes with metal or a potting material to reinforce the electrode. Furthermore, a layer of relatively soft metal may be provided above the blank as represented by the dot-dash line 67' in FIG. 4 to prevent splitting of the blank 67 when the latter is driven into the die master by a shock wave and the die has sharp contours of the type represented is FIGS. 1 and 2. Typical laminates for the purpose include nickel and tin which may be welded to the blank 67 and annealed prior to shock forming or thereafter, thereby relieving strain.

The invention described and illustrated is believed to admit of many modifications within the ability of persons skilled in the art, all such modifications being considered within the spirit and scope of the appended claims.

I claim:

1. A method of electrically machining a metallic workpiece adapted to constitute a first electrode to impart thereto a predetermined contour and configuration, said method comprising the steps of forming a tool electrode by juxtaposing a sheet metal electrode blank with a die master having contour and dimensions substantially corresponding to the predetermined contour and dimensions; subjecting said blank to at least one shock wave of an energy sufficient to plastically deform said blank against the contours of said die master, thereby imparting to said blank a complementary contour; spacedly juxtaposing said tool electrode with said first electrode across a machining gap; introducing into said gap a coolant liquid; and applying across said first and said tool electrodes an electric current of an intensity, character and duration sufficient to erode the workpiece in the region thereof confronting the contours of said tool electrode, while maintaining said gap substantially constant during the erosion of said workpiece, thereby imparting to said workpiece a contour substantially complementary to that of said tool electrode, said tool electrode being a finish-forming electrode and being shock formed directly against the contours of said die master, said method further comprising the steps of makings rough-forming tool electrode by juxtaposing a second blank with the contours of said die master, applying a separating layer of a thickness equal substantially to that of the first-mentioned blank between said second blank and the contours of said die master, subjecting said second blank to at least one shock wave of an intensity sufficient to plastically deform said second blank and said layer against the contours of said die master, thereby imparting a configuration to said second blank substantially complementary to the contour of said die master, thereafter removing said layer from said second blank to constitute same as said rough-forming electrode, and using said rough-forming electrode and said finish-forming electrode in succession to electrically erode said workpiece.

2. The method defined in claim 1 wherein the separating layer interposed between said second blank and the contours of said die master comprises said first blank.

3. The method defined in claim 1 wherein said coolant liquid is an electrolyte and said electric current is an electrolysis current poled electrolytically to erode said workpiece and solubilize the eroded portions thereof in the electrolyte.

4. The method defined in claim 1 wherein said coolant liquid is a dielectric and said electric current effects spark discharge across said gap to remove particles from said workpiece and suspend them in said dielectric.

5. The method defined in claim 1 wherein said shock wave is produced by effecting an electric discharge between a pair of electrodes in spaced-apart relation in a fluid medium in force-transmitting relationship with said blank along a surface thereof opposite the surface of said blank facing said die master.